United States Patent [19]
Dorris, Jr.

[11] Patent Number: 5,944,458
[45] Date of Patent: *Aug. 31, 1999

[54] BORING MACHINE ALIGNMENT SYSTEM AND METHOD OF USE

[76] Inventor: John W. Dorris, Jr., 5005, E. Canada, Tucson, Ariz. 85706

[*] Notice: This patent issued on a continued prosecution application filed under 37 CFR 1.53(d), and is subject to the twenty year patent term provisions of 35 U.S.C. 154(a)(2).

[21] Appl. No.: 08/578,875

[22] Filed: Dec. 22, 1995

[51] Int. Cl.$^6$ ...................................................... B23B 41/00
[52] U.S. Cl. ............................................. 408/80; 82/113
[58] Field of Search .................. 29/888.011, 557, 29/558; 408/80, 111, 1 R, 79, 82, 81, 83.5, 103, 709; 82/113, 114, 123

[56] References Cited

U.S. PATENT DOCUMENTS

| | | |
|---|---|---|
| 1,373,856 | 4/1921 | Bosch . |
| 1,404,989 | 1/1922 | Marcy . |
| 1,586,378 | 5/1926 | Moore . |
| 3,685,132 | 8/1972 | Hodge . |
| 3,880,544 | 4/1975 | Papadopulos ............................ 408/111 |
| 4,011,793 | 3/1977 | Grimsley .................................... 408/80 |
| 4,050,836 | 9/1977 | Anders ....................................... 408/80 |
| 4,414,869 | 11/1983 | Augustine ................................. 82/4 R |
| 4,580,931 | 4/1986 | Wilger et al. .......................... 408/72 R |
| 4,871,285 | 10/1989 | Moore ........................................ 408/80 |
| 4,899,458 | 2/1990 | Minelli ................................... 408/83.5 |
| 5,025,556 | 6/1991 | Stafford .............................. 29/888.011 |
| 5,030,041 | 7/1991 | Marron ...................................... 408/80 |
| 5,732,607 | 3/1998 | Strait ......................................... 408/80 |

*Primary Examiner*—Andrea L. Pitts
*Assistant Examiner*—Adesh Bhargava
*Attorney, Agent, or Firm*—Henderson & Sturm

[57] ABSTRACT

A method and apparatus (50) for forming counterbores (30) (32) in a selected cylinder borehole (12) in an engine block (11) by aligning and securing the column (51) of a boring machine (50) relative to both the longitudinal axis (20) of a given cylinder borehole (12) and the center (21) of the engine crankshaft (70) and then lowering the boring machine spindle (54) into the selected cylinder borehole (12) to form the counterbores (30) and (32).

19 Claims, 3 Drawing Sheets

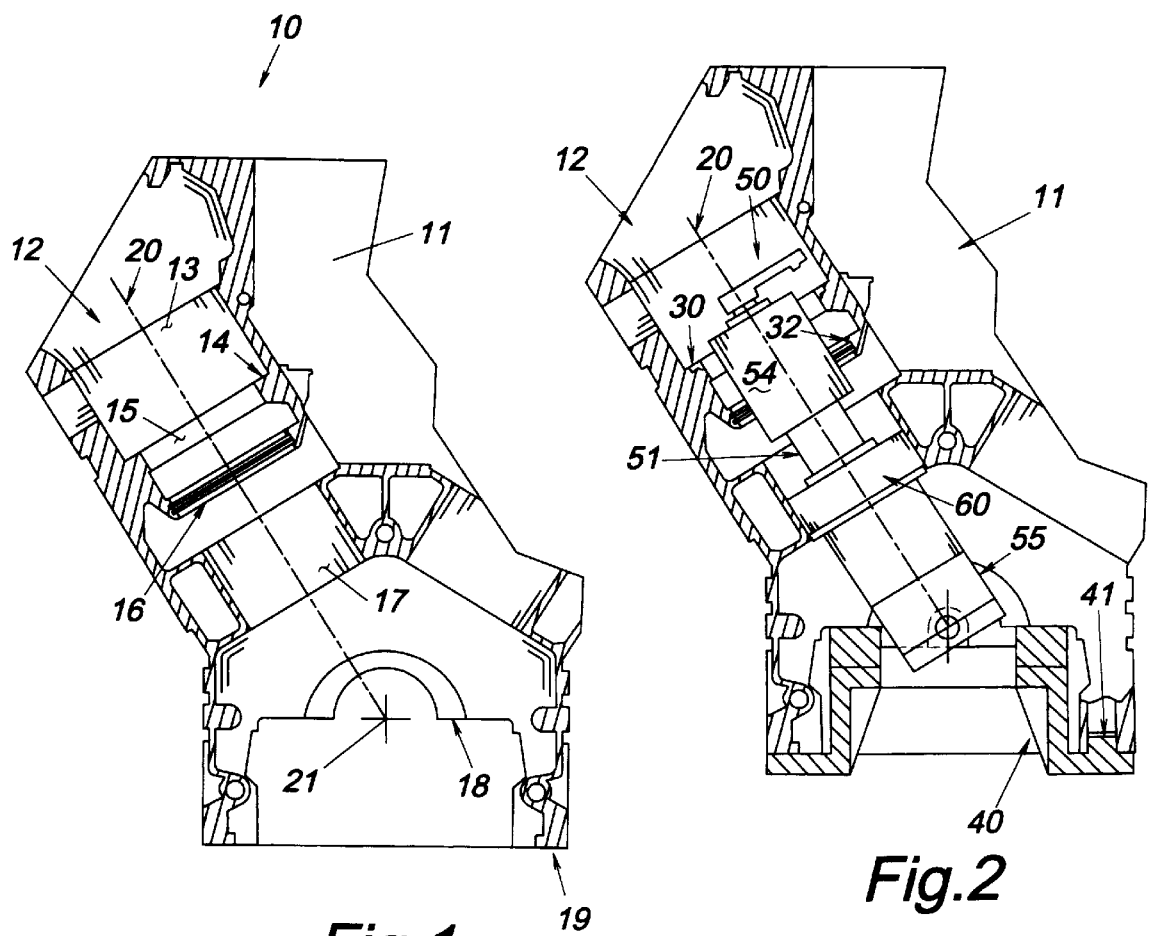
Fig.1
Fig.2
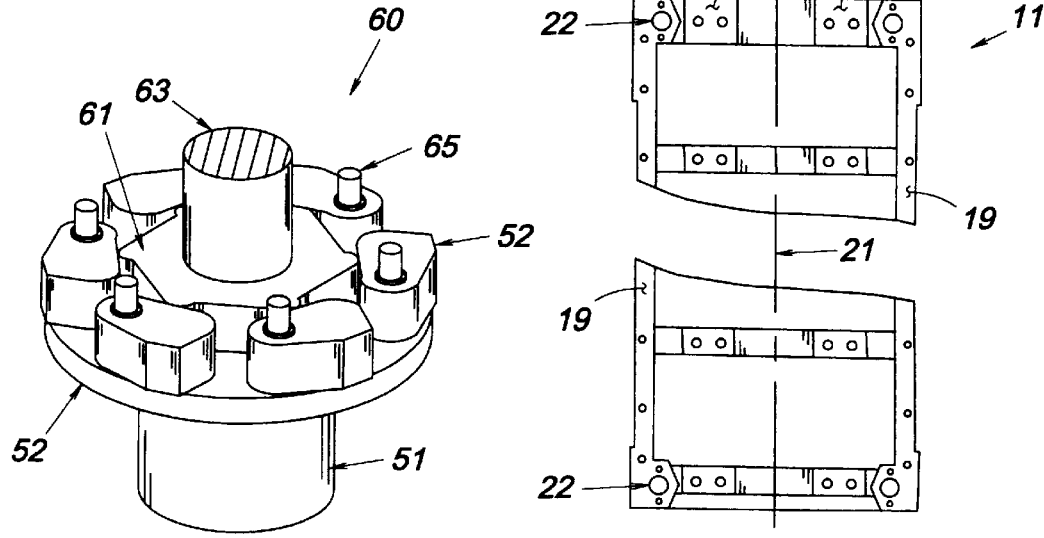
Fig.3
Fig.4

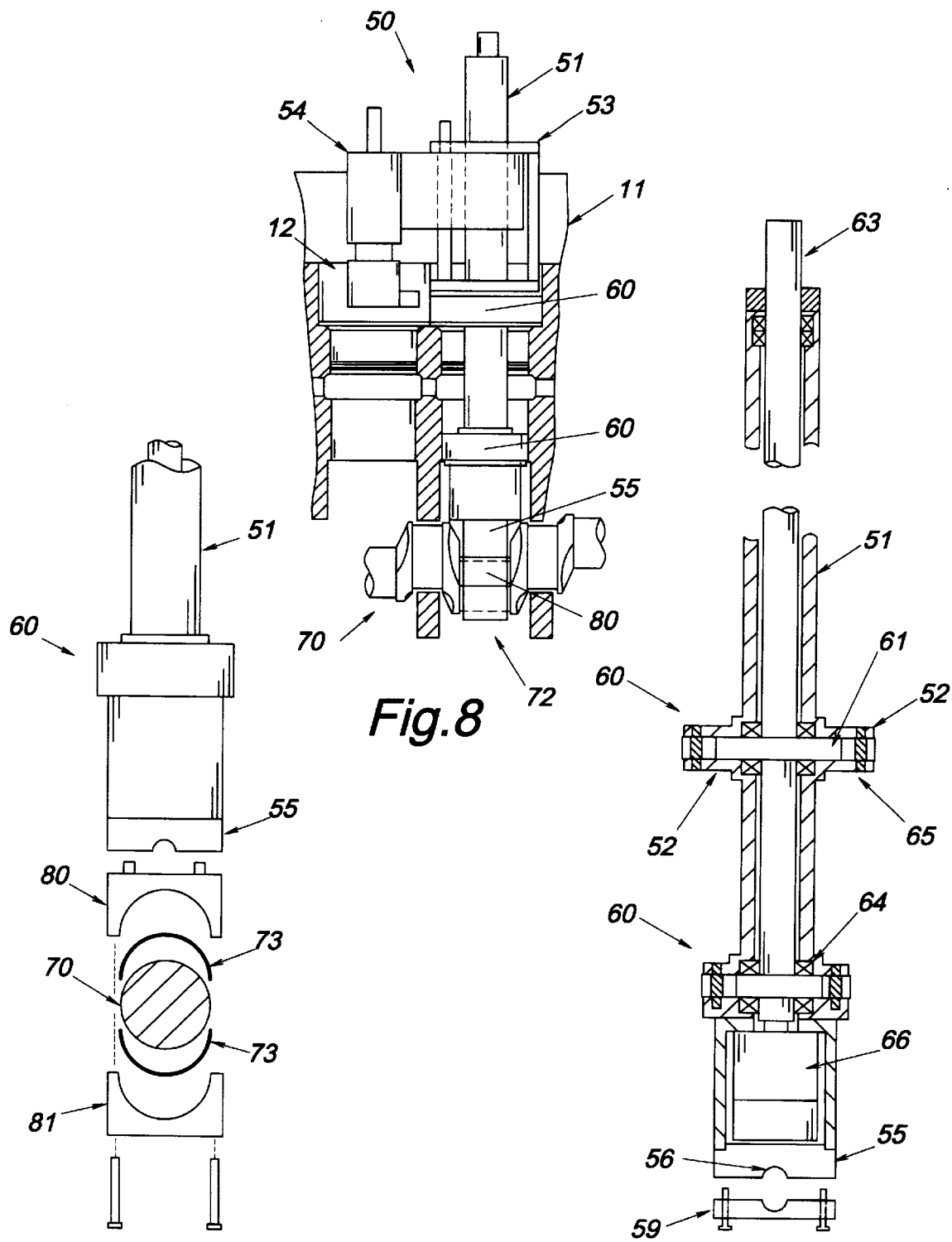

BORING MACHINE ALIGNMENT SYSTEM AND METHOD OF USE

TECHNICAL FIELD

The present invention relates to the field of boring machines in general, and in particular to a new system for aligning a boring machine relative to an engine block.

BACKGROUND ART

As can be seen by reference to the following U.S. Pat. Nos. 3,685,132; 1,373,856; 1,586,378; and 4,414,869; the prior art is replete with myriad and diverse borehole associated devices employed for a variety of purposes.

While all of the aforementioned prior art constructions are more than adequate for the basic purpose and function for which they have been specifically designed, they are neither designed, intended for, nor adaptable to the specific purpose and function for which the present invention was designed.

Up until the development of the subject matter of U.S. Pat. No. 5,222,295 which issued on Jun. 29, 1993 and is entitled Method of Repairing Diesel Engine Cylinder Blocks, no one had devised a practical method of refurbishing an engine cylinder block to accommodate liner inserts by forming a precision counterbore within the individual engine block boreholes; wherein, the counterbores were dimensioned to receive the liner inserts.

While the subject matter of the aforementioned patent was initially developed to repair diesel engine blocks at a central location, it soon became apparent that the delivery of the engine blocks to a central location would in many instances be impractical and/or financially prohibitive.

As a consequence of the foregoing situation, it became apparent that there has existed a longstanding need for a new type of boring machine alignment system that can be employed in the field at even remote locations to practice the principles first disclosed in U.S. Pat. No. 5,222,295; and, the provision of such a system is a stated objective of the present invention.

DISCLOSURE OF THE INVENTION

Briefly stated, the boring machine alignment system that forms the basis of the present invention relies on a fixed dual axis alignment principle; wherein, one of the fixed axis extends thru a selected cylinder borehole in the engine block and the other fixed axis coincides with the center of the engine block crankshaft.

As will be explained in greater detail further on in the specification, the boring machine that is employed in this invention is provided with an elongated shaft member provided with one or more expansible collar elements that are designed to axially align the shaft member relative to a given cylinder borehole.

In addition, the lower end of the elongated shaft member is provided with an adapter member that may be operatively engaged with either the crankshaft per se, or another fixed reference member, so that the depth of the counterbore produced by the boring machine may be precisely controlled.

In the first version, the lower end of the adaptor member is provided with an adaptor cap element that is designed to surroundingly engage the crankshaft journal in its bottom dead center position and dimensioned to precisely compensate for the offset between the crankshaft center and the bottom dead center.

In the second version, a datum plate is affixed to the bottom of the engine block, wherein the datum plate is provided with a fixed shaft member that coincides with the crankshaft center, and the lower end of the boring machine is provided with an end plug element that captively engages the fixed shaft member.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a front cross-sectional view taken thru an engine block prior to refurbishing;

FIG. 2 is a front cross-sectional view of a boring machine positioned within one of the cylinder boreholes of the engine block;

FIG. 3 is an isolated perspective view of a typical cylinder clamping member;

FIG. 4 is a bottom plan view of a typical diesel engine block;

FIG. 8 is a side cross-sectional view of the articulated boring machine with the lower end connected to the crankshaft;

FIG. 9 is an exploded perspective view of the adaptor member used in conjunction with the crankshaft; and FIG. 10 is a cross-sectional view of the boring machines column clamping mechanism.

BEST MODE OF CARRYING OUT THE INVENTION

Figure 5:
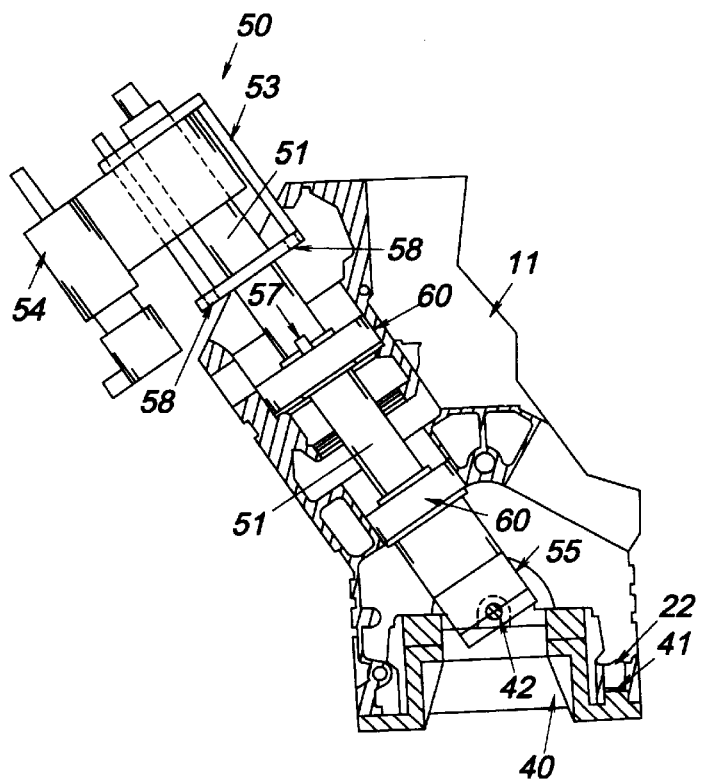
FIG. 5 is a front cross-sectional view of an articulated boring machine positioned within one cylinder boreholes in the engine block.

Referring to the illustrations, like numerals correspond to like parts depicted in the figures. As shown in FIG. 1, the engine (10) is comprised of a cylinder block (11) containing a plurality of elongated stepped shoulder cylindrical bores (12). Each elongated cylindrical bore (12) consists of an enlarged diameter upper bore (13), a shoulder (14), a reduced diameter pilot bore (15), a group of O-ring grooves (16), and a lower bore (17). Each of the bores is concentric to the cylinder's axis (20) and must be accurately located within the engine manufacturer's specifications from the crankshaft center (21) as measured along the cylinder's axis (20).

As depicted by FIGS. 1 and 4, the engine manufacturer provides two surfaces that are machined within accurate proximity to the crankshaft center (21); the main bearing split line (18) and the panrail (19). Additionally, a plurality of locating holes (22) are bored a precise distance from the crankshaft center (21) into the panrail (19).

As can be seen by reference to FIG. 2, the elongated cylindrical bore (12) may be refurbished by machining an upper stepped counterbore (30) and subsequently inserting a liner spacer seat insert (not shown), (see DORRIS, U.S. Pat. No. 5,222,295). Likewise, a second lower counterbore (32)

is formed to receive an O-ring seal insert (not shown) to repair eroded O-ring grooves. The refurbishing requires both counterbores (30) and (32) to be located concentric and perpendicular to the cylinder's axis (20). Additionally, the depth of the upper counterbore (30) and the lower counterbore (32) each must be controlled to maintain the correct proximity with the crankshaft center (21).

In the embodiment illustrated in FIG. 2 a boring machine 50 is inserted into a selected cylindrical bore (12) to form the counterbores (30) and (32). The boring machine (50) includes a column (51) having one or more expansible clamping collars (60) located along the columns axis to bring the column axis into precise coincidence with the cylinder axis (20) in a well recognized fashion.

At this juncture the initial alignment of the boring machine (50) along one of the dual axis required by the method of this invention has been completed; and, as will be explained presently there are two equally effective methods of performing the second critical axial alignment.

Figure 6:
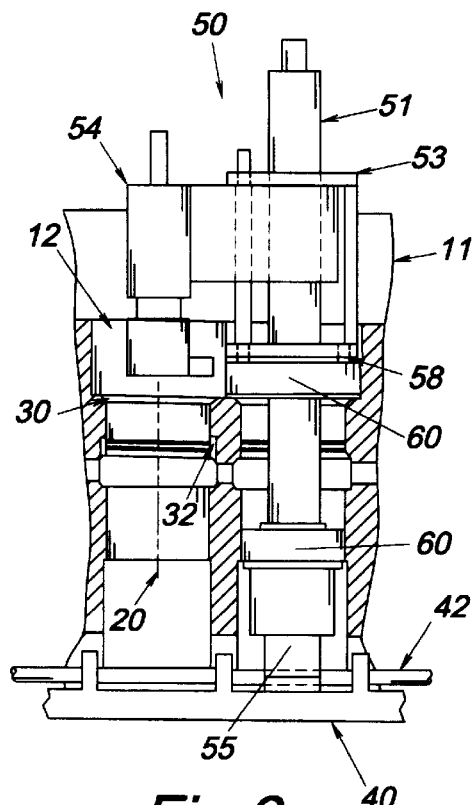
FIG. 6 is a side cross-sectional view of the articulated boring machine rotated into alignment with an adjacent cylinder borehole.

FIGS. 4 through 6 illustrate the preferred method in which a boring machine (50) can be accurately positioned within an elongated cylinder (12) to generate the upper counterbore (30) and lower counterbore (32) in an adjacent cylinder. A datum plate (40) containing a plurality of locating posts (41) and a fixed shaft (42) is secured to the main bearing split line (18), or alternatively to the panrail (19). The locating posts (41) mate with the locating holes (22) in the panrail and align the fixed shaft (42) coaxial with crankshaft center (21).

The boring machine (50) incorporates a column (51) with one or more cylindrical clamping collars (60) located along the column's axis. A boring spindle (54) is mounted to a swivel carriage (53), which may be manually rotated about the column (51). As shown in FIG. 10 at the base of the column (51) is an end plug (55) with a precise groove (56) machined across its bottom surface. Near the mid-section of the column are two dowel pins (57) whose centers are aligned with the groove. Securing the groove (56) on the fixed shaft (42) aligns the dowel pins (57) with the fixed shaft, given that the groove and fixed shaft have equal diameters. Hence, the dowel pins (57) can be used to provide a rotary stop that positions the boring spindle (54) by mating with two locating holes (58) in the swivel carriage (53).

Because a cylinder's axis (20) is parallel to another cylinder's axis within the same bank, the boring spindle (54) shown in FIGS. 5 and 6 would be parallel to the adjacent cylinder's axis (20). The boring machine maintains a center-to-center distance between the boring spindle (54) and the column (51) that is equal to the center-to-center distance between adjacent cylinders (12). By doing so, the swivel carriage (53) may be raised and pivoted about the column (51) and lowered onto the two dowel pins (57) to align the boring spindle (54) with the adjacent cylinder's axis (20). Furthermore, the column (51) is axially positioned by securing the end plug (55) onto the fixed shaft (42) using the end cap (59). Consequently, limit switches affixed to the column (51) can be used to control the travel of the boring spindle (54) and maintain the correct depth of the upper counterbore (30) and the lower counterbore (32).

FIGS. 3 and 10 illustrate a cylindrical clamping collar (60) that expands to locate the column (51) concentric with the cylinder's axis. The clamping collar (60) includes two disk members (52) attached to the column (51). Between the two disk members (52) is a cam (61) surrounded by cogs (62). The cam (61) is fastened to an axial shaft (63) which is supported internal and concentric to the column (51) by a group of radial bearings (64). As the cam (61) rotates, the cogs (62) are simultaneously driven out and provide the clamping pressure against the walls of the elongated cylinder (12). Machined pins (65) function as pivots for the cogs (62) and also provide axial alignment between the two disk members (52). The axial shaft (63) may be rotated and held electrically by a combined rotary actuator and brake unit (66). Alternatively, the axial shaft (63) may be driven and held by a hydraulic or pneumatic actuator, or manually torqued and locked.

Figure 7:
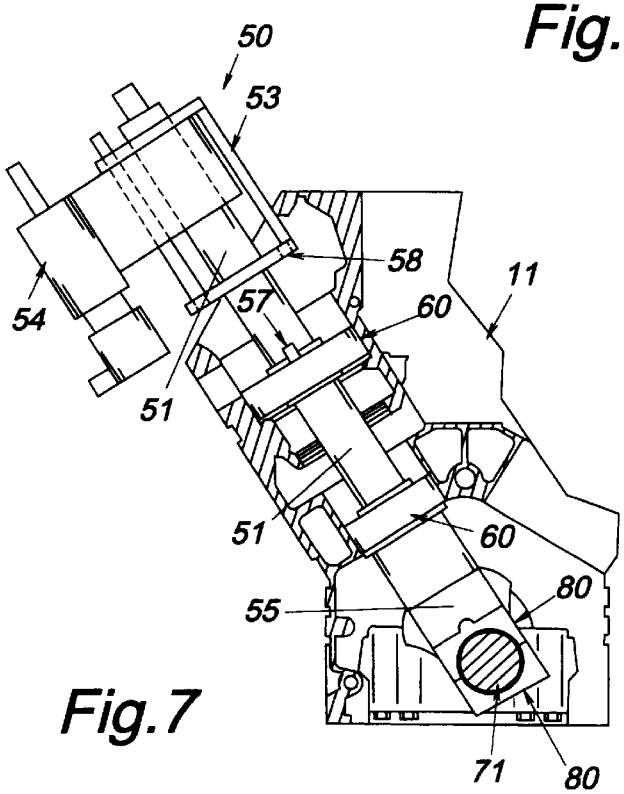
FIG. 7 is a front cross-sectional view of the articulated boring machine having its lower end connected to the crankshaft.

As shown by FIGS. 7 and 8, the setup of the boring machine (50) can be extended to refurbish a cylinder without full disassembly of the engine. After removing the connecting rods, pistons, cylinder heads, and liners from two adjacent cylinders, the crankshaft (70) is set to bottom dead center (72) with respect to the cylinder (12) which receives the column (51). The boring machine (50) is fitted with an end adaptor (80) having an elongated recess (82) dimensioned to permit the column (51) to be secured directly to the crankshaft journal (71) using a matching end cap (81). The end adapter (80) is dimensioned to account for the offset between the crankshaft center (21) and bottom dead center (72), and thereby preserves the correct axial position of the column (51). The end adapter (80) also provides the same cylinder to cylinder alignment at the end plug (55).

Referencing FIG. 9, the engine manufacturer supplies connecting rod bearing shells (73) in specific oversize thicknesses to match a reground crankshaft journal (71). The oversize bearing shells (73) compensate for the material that is removed from the crankshaft journal (71) to maintain a constant piston stroke. Likewise, the end adapter (80) and end cap (81) incorporate the connecting rod bearing shells (73) to accommodate a reground crankshaft journal (71). As a result, the column (51) is axially positioned the same whether or not the crankshaft journal (71) has been reground.

The method described herein utilizes the concentric bores of the elongated cylinder (12) to provide a first axial alignment of the boring machine (50). The setup also employs a datum plate (40), mounted to the main bearing split line (18), and the panrail locating holes (22) to provide a second axial and rotary positioning of the boring machine. Furthermore, if only a single cylinder needs to be refurbished, the alignment can be achieved by mounting the lower end of the boring machine (50) to the crankshaft (70) rather than to the datum plate (40).

These same principles of alignment can be extended to a boring machine (50) which would counterbore inside the same cylinder in which it is clamped. As shown in FIG. 2, a boring machine (50) that employs the same alignment principles described herein, could be disposed in and counterbore within the same cylinder (12). This boring machine (50) would use the datum plate (40) for axial positioning and a clamping collar (60) for axial alignment. Because the boring spindle (52) does not rotate about the column (51), there is no need for rotary stops. Moreover, the "same cylinder" boring machine (50) could also employ an end adapter (80) to attach directly to the crankshaft (70).

At this juncture, it should be apparent that the preferred embodiment of the invention employs the boring spindle (54) mounted on the swivel carriage (53) wherein the counterbores (30) and (32) may be formed in the cylinder boreholes (12) on either side of the cylinder borehole (12) in which the boring machine column (51) is deployed. In this way only a single alignment procedure is required for widely spaced pairs of cylinder boreholes (12).

It should also be noted that different circumstances will dictate whether the lower portion of the boring machine column (51) is attached to the fixed shaft (42) of the datum plate (40) of directly to the crankshaft (70) in its bottom dead center orientation.

As was previously mentioned, there will also be certain instances in which only a single cylinder borehole (12) would require refurbishing; and, in that set of circumstances a boring machine (50), such as illustrated in FIG. 2, could be employed to produce the counterbores (30) (32) within the same cylinder borehole (12) in which the boring machine column (51) is operatively aligned and deployed.

Given the basic method of refurbishing a diesel engine disclosed on U.S. Pat. No. 5,222,295, it should be appreciated that the present invention provides a method and apparatus for practicing the patented method that was heretofore unavailable; and, which will permit the patented method to be practiced under field conditions and at other remote locations.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An apparatus for forming at least one counterbore in a cylinder borehole in a conventional engine block having a plurality of aligned equally spaced cylinder boreholes; wherein, the apparatus comprises:
    a boring machine having an upper end and a lower end and an intermediate portion;
    an elongated boring machine column dimensioned to be received in a selected cylinder borehole; wherein, the upper end of the boring machine column is operatively associated with said boring machine;
    first alignment means associated with the intermediate portion of said boring machine column for aligning the longitudinal axis of the boring machine column along the longitudinal axis of said selected cylinder borehole; and
    second alignment means associated with the lower end of said boring machine column for aligning the lower end of boring machine column with a fixed axial reference point in the lower portion of said engine block; wherein the operative connection between the boring machine and the boring machine column comprises a swivel carriage mounted for relative rotation with respect to the boring machine column.

2. The apparatus as in claim 1 wherein, said first alignment means comprises:
    an expansible clamping cole surrounding the boring machine column and adapted to captively engage the Interior surface of said selected cylinder borehole.

3. The apparatus as in claim 2 where said fixed axial reference point comprises the longitudinal axis of the engine block crankshaft.

4. The apparatus as in claim 3 wherein, said second alignment means comprises:
    a datum plate operatively secured to the bottom of said engine block;
    wherein said datum plate is further provided with a fixed shaft which is aligned along the longitudinal axis of the engine block crankshaft.

5. The apparatus as in claim 4 wherein, said second alignment means further comprises:
    an end plug associated with the bottom of said boring machine column;
    wherein, the end plug is further provided with a groove dimensioned to receive the fixed shaft on said datum plate.

6. The apparatus as in claim 3 wherein, the engine block is equipped with a crankshaft and wherein the second alignment means comprises:
    an end adapter associated with the bottom of the boring machine column, and provided with an enlarged recess dimensioned to receive the engine block crankshaft in the bottom dead center position of the crankshaft journal.

7. The apparatus as in claim 6 wherein, said end adapter is dimensioned to compensate for the offset between the longitudinal axis of the crankshaft and the bottom dead center of the crankshaft journal.

8. The apparatus as in claim 1 wherein, the boring machine is disposed in said selected cylinder borehole.

9. The apparatus as in claim 1 wherein, said boring machine further includes a boring spindle mounted on said swivel carriage wherein the boring spindle is dimensioned to extend into the cylinder boreholes on opposite sides of said selected cylinder borehole.

10. The apparatus as in claim 9 further including:
    third alignment means for selectively positioning said boring spindle into alignment with the longitudinal axis of the cylinder boreholes on opposite sides of said selected cylinder borehole.

11. The apparatus as in claim 9, wherein, the third alignment means comprise:
    registration members on the swivel carriage and boring machine column respectively which cooperate with one another to captively engage the swivel carriage relative to the boring machine column at two locations diametrically opposed to one another.

12. An apparatus for forming at least one counterbore in a cylinder borehole in a conventional engine block having a plurality of aligned equally spaced cylinder boreholes; wherein, the apparatus comprises:
    a boring machine having an upper end and a lower end and an intermediate portion;
    an elongated boring machine column dimensioned to be received in a selected cylinder borehole; wherein, the upper end of the boring machine column is operatively associated with said boring machine;
    first alignment means associated with the intermediate portion of said boring machine column for aligning the longitudinal axis of the boring machine column along the longitudinal axis of said selected cylinder borehole; wherein said first alignment means comprises an expansible clamping collar surrounding the boring machine column and adapted to captively engage the interior surface of said selected cylinder borehole; and
    second alignment means associated with the lower end of said boring machine column for aligning the lower end of boring machine column with a fixed axial reference point in the lower portion of said engine block wherein said fixed axial reference point comprises the longitudinal axis of the engine block crankshaft, and wherein, said second alignment means comprises:
        both a datum plate operatively secured to the bottom of said engine block; wherein said datum plate is further provided with a fixed shaft which is aligned along the longitudinal axis of the engine block crankshaft and an end plug associated with the bottom of said boring machine column; wherein, the end plug is further provided with a groove dimensioned to receive the fixed shaft on said datum plate.

13. The apparatus as in claim 12 wherein, the engine block is equipped with a crankshaft and wherein the second alignment means comprises:

an end adapter associated with the bottom of the boring machine column, and provided with an enlarged recess dimensioned to receive the engine block crankshaft in the bottom dead center position of the crankshaft journal.

14. The apparatus as in claim 13 wherein, said end adapter is dimensioned to compensate for the offset between the longitudinal axis of the crankshaft and the bottom dead center of the crankshaft journal.

15. The apparatus as in claim 12 wherein, the boring machine is disposed in said selected cylinder borehole.

16. The apparatus as in claim 12 wherein the operative connection between the boring machine and the boring machine column comprises:

a swivel carriage mounted for relative rotation with respect to the boring machine column.

17. The apparatus as in claim 16 wherein, said boring machine further includes a boring spindle mounted on said swivel carriage wherein the boring spindle is dimensioned to extend into the cylinder boreholes on opposite sides of said selected cylinder borehole.

18. The apparatus as in claim 17 further including:

third alignment means for selectively positioning said boring spindle into alignment with the longitudinal axis of the cylinder boreholes on opposite sides of said selected cylinder borehole.

19. The apparatus as in claim 18, wherein, the third alignment means comprise:

registration members on the swivel carriage and boring machine column respectively which cooperate with one another to captively engage the swivel carriage relative to the boring machine column at two locations diametrically opposed to one another.

* * * * *